Nov. 1, 1966 A. SCHWEBEL 3,282,586
CONVEYOR FOR SHEET-FEEDING APPARATUS IN
SHEET-PROCESSING MACHINES
Filed Sept. 22, 1964

Inventor:
ADOLF SCHWEBEL
By Hane and Nydick
ATTORNEYS

United States Patent Office 3,282,586
Patented Nov. 1, 1966

3,282,586
CONVEYOR FOR SHEET-FEEDING APPARATUS
IN SHEET-PROCESSING MACHINES
Adolf Schwebel, Offenbach am Main, Germany, assignor to Mabeg Maschinenbau G.m.b.H. Nachf. Hense & Pleines G.m.b.H. & Co., Offenbach am Main, Germany
Filed Sept. 22, 1964, Ser. No. 398,290
Claims priority, application Germany, Oct. 15, 1963,
M 58,816
11 Claims. (Cl. 271—45)

The invention relates to a conveyor for sheet feeding apparatus in sheet processing machines with perforated conveyor belts bands, or tapes, hereinafter referred to as "tapes" circulating over vacuum sources in a feed table.

A conveyor is known having conveyor tapes which are provided with wide suction slots and take over the drive and conveying of the sheets separated from the pile. With these tapes, the cross-sectional area for the vacuum from the stationary vacuum source to the suction slot on the conveyor tape varies to the detriment of the conveying effect when the tape is displaced transversely in relation to the conveying direction.

In accordance with the present invention, this disadvantage is overcome in that the conveyor tapes are provided, at the side adjacent to the vacuum sources and in the region of the holes, with a suction trough, the width of which amounts to a multiple of the diameter of the suction holes.

A further advantage is obtained in that the suction trough which extends in the direction in which the sheets are conveyed, is divided into suction chambers.

The invention is illustrated by exemplifying embodiments described with reference to the accompanying drawing wherein.

Figure 1:
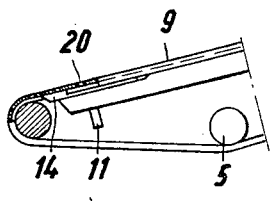
FIGURE 1 represents an elevation view of a conveyor-tape arrangement with suction chambers.
Figure 2:
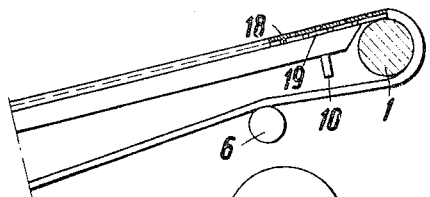
FIGURE 2 is an elevation view of a conveyor-tape arrangement with a vacuum trough.
Figure 2:
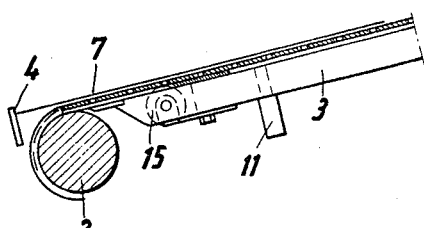

In the arrangements shown in FIGURES 1 and 2, between a conveyor roll 1 and a tape roll 2 there is arranged a feed table 3 which is necessary for the further conveying of the sheet separated from the pile and with which are associated so-called front stops and guides 4 (FIGURE 2), grippers or the like for conveying the sheet further into the sheet-processing machine or printing press. Tape tension rollers 5 and 6 (FIGURE 1) are below the feed table.

One or more endless conveyor tapes 8 or 9 respectively, which run over the feed table and are guided by the conveyor roll 1 and tape roll 2, are provided to convey the sheets 7 which are transfrred from a separating means (not shown) to the conveyor roll 1. The necessary tensioning of the tapes, insofar as this is important for the conveying, is effected and controlled in known manner by the tape tension rollers 5 and 6. Extending in their direction of travel, the conveyor tapes 8 and 9 have longitudinal suction troughs or grooves 12 formed in their surfaces adjacent the tape table 3 with suction holes 20 at intervals extending through the tapes from the troughs to their upper sides.

The troughs in the tapes are subjected to vacuum by means of connections 10, 11 which are arranged in staggered relationship in the direction of conveying and transversely thereto in the feed table, and which are connected to a vacuum source through control means (not shown) for opening and closing the vacuum supply from the source.

In order to seal the ends of the troughs in the tapes various means may be employed. Such means include projections or slides 13 and 14 (FIGURES 1 and 2) or a roller 15 (FIGURE 2) which lie within the troughs adjacent the ends of the feed table. The positioning of the roller 15 may be adjustable.

Figure 5:
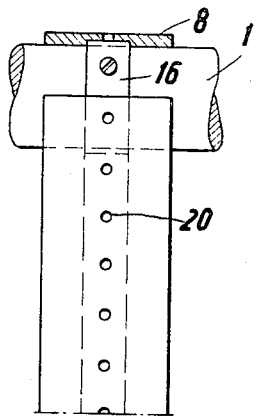
FIGURE 5 is a plan view of a tape arrangement with a guide ring.

In FIGURE 5 there is shown a track ring 16 which may be provided on the conveyor roll 1 if necessary to act as a further guiding and sealing means within the tape trough.

All the tapes can be displaced transversely in relation to the direction in which the sheets are conveyed.

Figure 3:
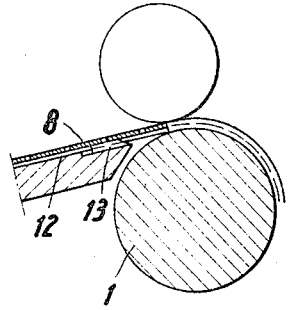
FIGURE 3 is a cross-section through the conveyor-tape with suction chambers used in the arrangement shown in FIGURE 4.
Figure 3:
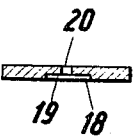
Figure 4:
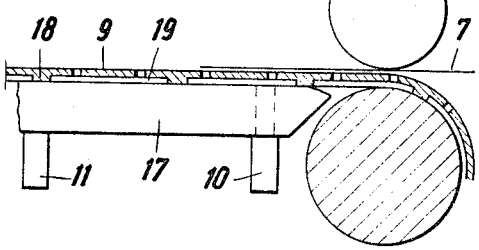
FIGURE 4 is an enlarged illustration of a part of the arrangement shown in FIGURE 1.

In the embodiment shown most clearly in FIGURES 3 and 4, the conveyor and feed table 17 has no slides, rollers or the like to act as end seals for the troughs in the tapes 9. The longitudinal trough in each of these tapes is divided transversely by webs 18 into individual vacuum chambers 19, the partition walls 18 acting as supporting webs for the portion of the tape perforated with the suction holes 20.

Figure 6:
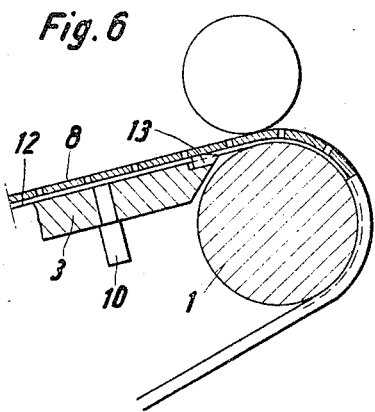
FIGURE 6 is an enlarged illustration of a part of the arrangement shown in FIGURE 2.

The tapes 8 constructed as shown in FIGURES 2 and 6 only require one vacuum connection 10 or 11 to apply the vacuum over the whole length of the table or conveying path traversed by the tapes. A plurality of such nozzles may however supply the longitudinal trough of each tape simultaneously over its whole length to compensate for suction losses.

In the embodiment shown most clearly in FIGURE 4, the suction of a vacuum chamber is maintained and carried forward in the conveying direction to the extent which is possible with the nozzle 10.

This arrangement would be sufficient in the region of the front sheet guides and when particularly strong sheets of paper or cardboard have to be conveyed.

The detaching of a sheet from the conveyor tape or its delivery when it has reached the front guide 4 can be achieved and facilitated by means of the sealing slide 14 which interrupts the vacuum supply as the sheet carried by the tapes reaches the end of the feed table.

This control may be rendered automatic, electrically or pneumatically, by means of the switches connected to the front guides 4. Such devices are known and are not a subject of the invention.

The embodiments illustrated by way of example are not exhaustive. Apart from the advantages already mentioned at the beginning, they also have the advantage that no superstructures arranged over the table are present, such as frames, conveying rollers, guide springs and other guide and auxiliary means which might form a considerable detriment to the guiding and a risk to the sheets or web of sheets.

What I claim is:
1. A sheet feeder for a sheet processing machine, said sheet feeder comprising, in combination, a band conveyor having a sheet supporting upper side and a lower side, said conveyor including lengthwise spaced apertures and in its lower side a lengthwise, laterally closed groove communicating with said apertures, a feed table, guide means guiding said conveyor across said table, sealing means sealing said groove against said table substantially at the beginning and at the end respectively of the travel of the conveyor across the table, and suction means communicating with the portion of the groove sealed against the table to generate suction in the apertures in communication with the sealed groove portion whereby sheets placed upon the upper side of the conveyor are retained thereon while travelling across the table and are released at the end of such travel.

2. A sheet feeder according to claim 1, wherein the crosswise width of said groove is a multiple of the crosswise width of said apertures.

3. A sheet feeder according to claim 1, wherein said guide means and said sealing means are transversely adjustable in reference to the direction of travel of the conveyor across the table.

4. A sheet feeder according to claim 1, wherein said sealing means comprise projections supported by the table and protruding therefrom in slidable engagement with the beginning and the end of the groove portion in juxtaposition with the table.

5. A sheet feeder according to claim 1, wherein said sealing means comprise a roller rotatably supported on the table and slidably engaging the groove while the same is travelling across the table.

6. A sheet feeder according to claim 1, wherein said guide means comprise rollers guiding said conveyor across said table, and wherein said sealing means comprise a peripheral sealing ring mounted on at least one of said rollers and engaging the groove portion passing said roller.

7. A sheet feeder according to claim 6, wherein said sealing ring is axially displaceable on the respective roller.

8. A sheet feeder according to claim 1, wherein said suction means comprise a plurality of suction ducts transversely staggered in reference to the direction of travel of the conveyor across the table.

9. A sheet feeder according to claim 1, wherein said suction means comprise a plurality of suction ducts staggered in the direction of travel of the conveyor across the table.

10. A sheet feeder according to claim 1, wherein the lower side of the conveyor includes several parallel lengthwise grooves, the portion of each of said grooves travelling across the table being sealed by said sealing means and communicating with said suction means.

11. A sheet feeder for a sheet processing machine, said sheet feeder comprising, in combination, a feed table, a band conveyor having a sheet supporting upper side and a lower side, said conveyor including lengthwise laterally spaced apertures and in its lower side a lengthwise groove divided by crosswise partition walls into several spaced apart groove portions, each of said groove portions communicating with at least one of said apertures, said partition walls sealing the groove portions to the feed table when and while passing across the same, and suction means communicating with the groove portions sealed against the table to generate suction in the respective apertures whereby sheets placed upon the upper side of the conveyor are retained thereon while travelling across the table and are released at the end of such travel.

References Cited by the Examiner

UNITED STATES PATENTS 3,123,354   3/1964   Ungerer _____ 271—74
3,198,517   8/1965   Martin _____ 271—45 X M. HENSON WOOD, Jr., *Primary Examiner.*

ROBERT B. REEVES, *Examiner.*

J. N. ERLICH, *Assistant Examiner.*